US007974213B2

(12) United States Patent
Sinha et al.

(10) Patent No.: US 7,974,213 B2
(45) Date of Patent: Jul. 5, 2011

(54) METHODS AND APPARATUS TO SELECT COMPOSITE LINK COST-OUT THRESHOLDS

(75) Inventors: Rakesh Kumar Sinha, Edison, NJ (US); Kostas N. Oikonomou, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 64 days.

(21) Appl. No.: 12/275,948

(22) Filed: Nov. 21, 2008

(65) Prior Publication Data

US 2010/0128629 A1    May 27, 2010

(51) Int. Cl.
*H04L 12/28* (2006.01)
(52) U.S. Cl. .................. 370/252; 370/255
(58) Field of Classification Search .......... 370/216, 370/241, 241.1, 242, 248, 253, 254, 255, 370/351, 431, 437, 464, 465; 709/226, 227
See application file for complete search history.

(56) References Cited

U.S. PATENT DOCUMENTS

| | | | |
|---|---|---|---|
| 6,091,724 A | 7/2000 | Chandra et al. | |
| 6,094,683 A | 7/2000 | Drottar et al. | |
| 6,363,319 B1 * | 3/2002 | Hsu ............... | 701/202 |
| 6,549,540 B1 | 4/2003 | Ward | |
| 6,910,149 B2 | 6/2005 | Perloff et al. | |
| 6,925,061 B2 * | 8/2005 | Lee et al. ............ | 370/238 |
| 6,956,821 B2 * | 10/2005 | Szviatovszki et al. ....... | 370/237 |
| 7,054,276 B2 | 5/2006 | Kaplan | |
| 7,187,652 B2 * | 3/2007 | Lee et al. ............ | 370/238 |
| 7,345,994 B2 | 3/2008 | Sivabalan et al. | |
| 7,352,703 B2 * | 4/2008 | Elie-Dit-Cosaque et al. | 370/237 |
| 7,352,747 B2 | 4/2008 | Walid et al. | |
| 7,599,385 B1 * | 10/2009 | Andrade et al. ............ | 370/437 |
| 2005/0160171 A1 | 7/2005 | Rabie et al. | |
| 2006/0023677 A1 | 2/2006 | Labrador et al. | |
| 2006/0034268 A1 | 2/2006 | Kim et al. | |

OTHER PUBLICATIONS

Agarwal et al., "Network Performability Evaluation for Different Routing Schemes," AT&T Lab Research, Optical Fiber Communication and the National Fiber Optic Engineers Conference, held in Anaheim, C.A., U.S.A., on Mar. 25-29, 2007 (5 pages).
Agarwal et al., PowerPoint presentation of "Network Performability Evaluation for Different Routing Schemes," AT&T Lab Research, Optical Fiber Communication and the National Fiber Optic Engineers Conference, held in Anaheim, C.A., U.S.A., on Mar. 25-29, 2007 (18 pages).
U.S. Appl. No. 12/075,734, filed Mar. 13, 2008, entitled, "Network Performance and Reliability Evaluation Taking Into Account Attributes Other Than Only the Capacities of Edges" (72 pages).

(Continued)

*Primary Examiner* — Seema S Rao
*Assistant Examiner* — Mon Cheri S Davenport
(74) *Attorney, Agent, or Firm* — Hanley, Flight & Zimmerman, LLC.

(57) ABSTRACT

Methods and apparatus to select composite link cost-out thresholds are disclosed. A disclosed example method comprises collecting traffic statistics for a communication network, computing, based on the collected traffic statistics, a plurality of flow rates for a composite link of the communication network for respective ones of a plurality of potential fault conditions for the composite link, computing a plurality of remaining capacities of the composite link for respective ones of the plurality of fault conditions, computing a plurality of differences between respective ones of the plurality of flow rates and the plurality of remaining capacities, and selecting a cost-out threshold for the composite link based on the plurality of computed differences.

21 Claims, 5 Drawing Sheets

OTHER PUBLICATIONS

U.S. Appl. No. 12/075,735, filed Mar. 13, 2008, entitled, "Network Performance and Reliability Evaluation Taking Into Account Abstract Components" (73 pages).

U.S. Appl. No. 12/075,719, filed Mar. 13, 2008, entitled, "Network Performance and Reliability Evaluation Taking Into Account Multiple Traffic Matters" (75 pages).

* cited by examiner

| | | | |
|---|---|---|---|
| $C_1$ | 1 OC-192 | 14 | $L_1$ |
| $C_2$ | 6 OC-48 | 12 | $L_2$ |
| {$C_3, C_7$} | 1 OC-192, 2 OC-48 | 12 | $L_3$ |
| $C_5$ | 2 OC-192, 1 OC-48 | 9 | $L_4$ |

| | | | |
|---|---|---|---|
| 14 | $P_1 = Pr(C_1)$ | $L_1$ | $P_1 L_1$ |
| 12 | $P_{23} = Pr(C_2) + Pr(C_3, C_7)$ | $L_2 + L_3$ | $Pr(C_2) L_2 + Pr(C_3, C_7) L_3$ |
| 9 | $P_4 = Pr(C_5)$ | $L_4$ | $P_4 L_4$ |

US 7,974,213 B2

METHODS AND APPARATUS TO SELECT COMPOSITE LINK COST-OUT THRESHOLDS

FIELD OF THE DISCLOSURE

This disclosure relates generally to composite links and, more particularly, to methods and apparatus to select composite link cost-out thresholds.

BACKGROUND

Some routers implement a link bundling feature whereby two or more communication paths are collectively utilized, considered and/or managed as a single logical composite link. Link bundling provides a number of advantages including, for example, reducing the number of open shortest path first (OSPF) adjacencies and/or improving network scalability. Moreover, when a member of a composite link fails, routers can redistribute traffic onto the remaining member(s) of the composite link without needing to compute a new shortest path tree. In some examples, routers utilize cost-out thresholds to determine when particular composite links are no longer to be used to transport data. In particular, when the capacity of the composite link falls below the cost-out threshold, the composite link is "costed out" when computing OSPF adjacencies.

DETAILED DESCRIPTION

Example methods and apparatus to select composite link cost-out thresholds are disclosed. A disclosed example method includes collecting traffic statistics for a communication network, computing, based on the collected traffic statistics, a plurality of flow rates for a composite link of the communication network for respective ones of a plurality of potential fault conditions for the composite link, computing a plurality of remaining capacities of the composite link for respective ones of the plurality of fault conditions, and selecting a cost-out threshold for the composite link based on the plurality of computed flow rates and the plurality of computed remaining capacities.

A disclosed example apparatus includes a collector to collect traffic statistics for a communication network, a network modeler to compute, based on the collected traffic statistics, a plurality of flow rates for a composite link of the communication network for respective ones of a plurality of potential fault conditions for the composite link, and to compute a plurality of remaining capacities of the composite link for respective ones of the plurality of fault conditions, and a threshold chooser to select a cost-out threshold for the composite link based on the plurality of computed flow rates and the plurality of computed remaining capacities.

In the interest of brevity and clarity, throughout the following disclosure references will be made to an example communication system 100 of FIG. 1. However, the methods and apparatus described herein to select composite link cost-out thresholds are applicable to other types of communication systems constructed using other network technologies, topologies and/or protocols.

Figure 1:
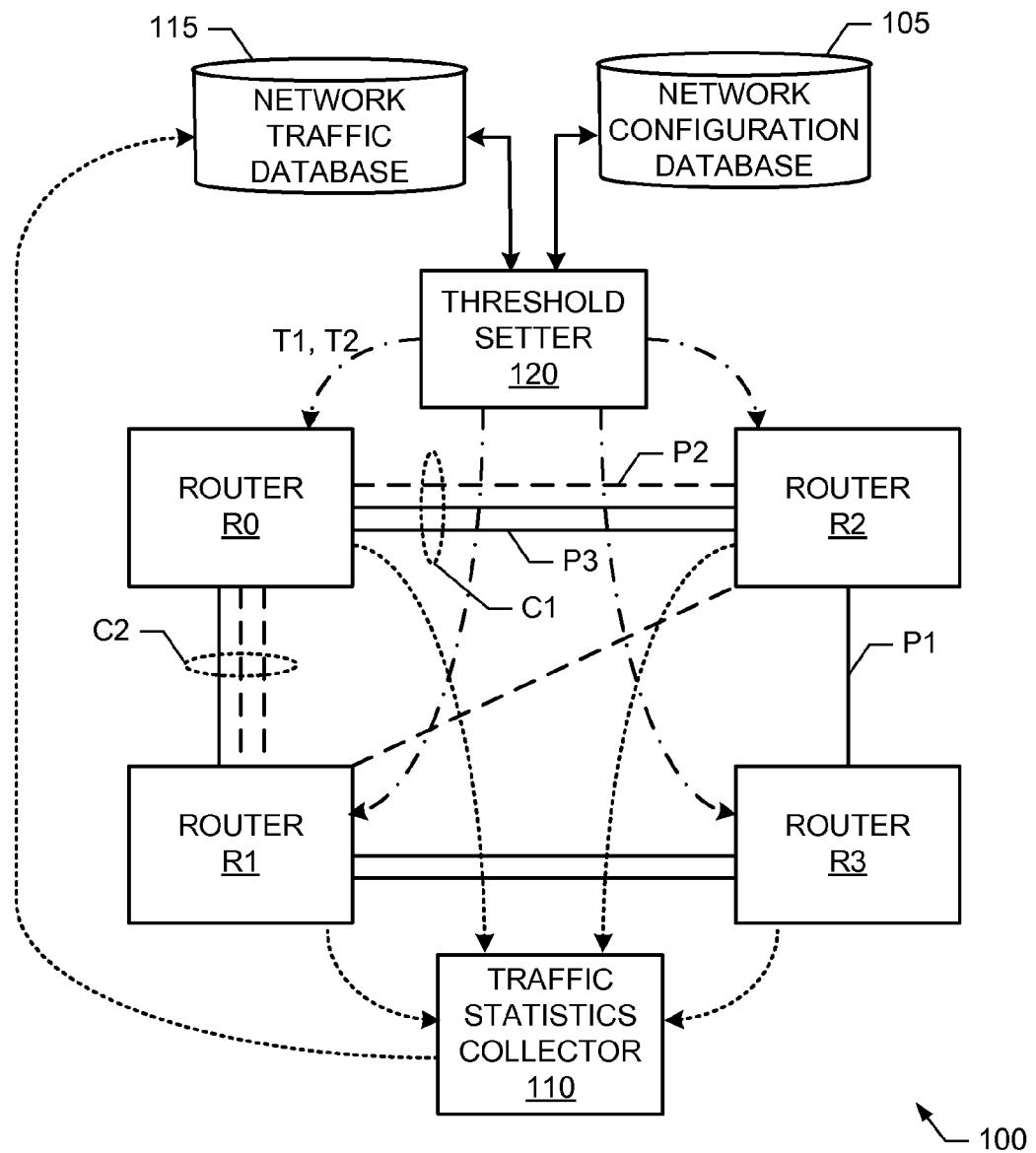
FIG. 1 is a schematic illustration of an example communication system constructed in accordance with the teachings of this disclosure.

FIG. 1 illustrates the example communication system 100. The example communication system 100 of FIG. 1 includes any number and/or type(s) of routers, four of which are designated are reference numerals R0, R1, R2 and R3. The example routers R0-R3 of FIG. 1 can be arranged in any topology(-ies) and interconnected via any number and/or type(s) of communication paths (one of which is designated at reference numeral P1), communication links and/or composite links (two of which are designated at reference numeral C1 and C2). Composite links are sometimes also referred to as link bundles. The example composite links C1 and C2 of FIG. 1 include any number and/or types of communication paths and/or links, two of which are designated at reference numeral P2 and P3. Example communication paths P1-P3 include, but are not limited to, an OC-48 (that is, an optical carrier (OC) communication path operating at 48×51.8 millions of bits per second (Mbps)), an OC-192, etc. An example composite link C1, C2 comprises ten OC-48s and two OC-192s. The communication paths P2, P3 of a composite link C1, C2 do not have to be implemented by and/or within the same cable, and/or do not have to the same geographical routing between a pair of routers R0-R3. Thus, a layer 1 defect such as a cable cut that affects a particular communication path P2, P3 of a composite link C1, C2 may not affect all communication paths P2, P3 of the composite link C1, C2. In many instances, a layer 1 defect will only affect a portion of the capacity of a composite link C1, C2.

In the illustrated example of FIG. 1, each of the routers R0-R3 is configured with a cost-out threshold for each composite link C1, C2 that is communicatively coupled to the router R0-R3. For example, the router R0 is configured with a first cost-out threshold T1 for the example composite link C1 and a second cost-out threshold T2 for the example composite link C2. The cost-out thresholds T1 and T2 provisioned and/or configured into a router R0-R3 need not be the same. Each of the example routers R0-R3 of FIG. 1 monitor the capacity of each composite link C1, C2 communicatively coupled to the router R0-R3 and, when the capacity of the composite link C1, C2 falls below the corresponding cost-out threshold T1, T2, the router R0-R3 stops routing and/or transporting data via the composite link C1, C2. While each of the example routers R0-R3 of FIG. 1 is configured and/or configurable with one or more cost-out thresholds T1 and T2, not all routers of a communication system need to be configurable and/or provisionable with cost-out thresholds.

The example routers R0-R3 of the example communication system 100 of FIG. 1 are configured from and/or based on any type of router configuration database 105. The example configuration database 105 of FIG. 1 contains router configuration information or data, and/or a router configuration file for each of the example routers R0-R3. The configuration information, data and/or file for a particular router R0-R3 defines the communication paths P1-P3 and/or composite links C1 and C2 that are communicatively coupled to that router R0-R3, the network interfaces associated with the paths P1-P3 and the composite links C1 and C2, and the IP connectivity configured for and/or provisioned to that router R0-R3. Router configuration data may be stored in the example router configuration database 105 using any number and/or type(s) of data structures. The example router configuration database 105 of FIG. 1 may be implemented using any number and/or type(s) of memory(-ies) and/or memory devices (not shown).

To collect traffic data and/or statistics, the example communication system 100 of FIG. 1 includes any number and/or type(s) of traffic statistics collectors, one of which is designated at reference numeral 110. The example traffic statistics collector 110 of FIG. 1 collects from the example routers R0-R3 information regarding the current and/or historical amounts of data that have been and/or are being routed and/or transported across each of the communication paths P1-P3 and/or the composite links C1 and C2. The example traffic statistics collector 110 may collect traffic data and/or statistics from the example routers R0-R3 using any number and/or type(s) of method(s), protocol(s) and/or interface(s). The traffic statistics collector 110 stores the collected traffic data and/or statistics in any type of network traffic database 115 using any number and/or type(s) of data structure(s). The example network traffic database 115 of FIG. 1 of FIG. 1 may be implemented using any number and/or type(s) of memory(-ies) and/or memory devices (not shown).

To determine, compute, optimize and/or otherwise select composite link cost-out thresholds, the example communication system of FIG. 1 includes a threshold setter 120. Based on network topology and/or network configuration information stored in the example network configuration database 105 and network traffic data and/or statistics stored in the example network traffic database 115, the example threshold setter 120 of FIG. 1 selects a cost-out threshold for each of the composite links C1 and C2 of the example communication system 100. In general, a lower threshold reduces the likelihood that a defect on a composite link C1, C2 causes a potentially different threshold to be triggered on another composite link C1, C2. However, if composite link cost-out thresholds are set too low, they may lose their effectiveness and/or may cause dropped or delayed data. If composite link cost-out thresholds are set to high too much network transport capacity may be removed causing congestion within the communication system 100. The example threshold setter 120 of FIG. 1 performs a probabilistic cost-benefit analysis of the communication system 100 under different failure conditions to select thresholds that are as low as possible without introducing problems elsewhere within the communication system 100. As shown in FIG. 1, the example threshold setter 120 configures the example routers R0-R3 with the cost-out thresholds selected by the threshold setter 120. An example manner of implementing the example threshold setter 120 of FIG. 1 is described below in connection with FIG. 2. Additionally or alternatively, example processes that may be carried out to select composite link cost-out thresholds are described below in connection with FIGS. 5 and 6.

While an example communication system 100 has been illustrated in FIG. 1, one or more of the interfaces, data structures, elements, processes and/or devices illustrated in FIG. 1 may be combined, divided, re-arranged, omitted, eliminated and/or implemented in any other way. Further, the example routers R0-R3, the example router configuration database 105, the example traffic statistics collector 110, the example network traffic database 115, and/or the example threshold setter 120 of FIG. 1 may be implemented by hardware, software, firmware and/or any combination of hardware, software and/or firmware. Thus, for example, any of the example routers R0-R3, the example router configuration database 105, the example traffic statistics collector 110, the example network traffic database 115, and/or the example threshold setter 120 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

Figures 2, 3, 4:
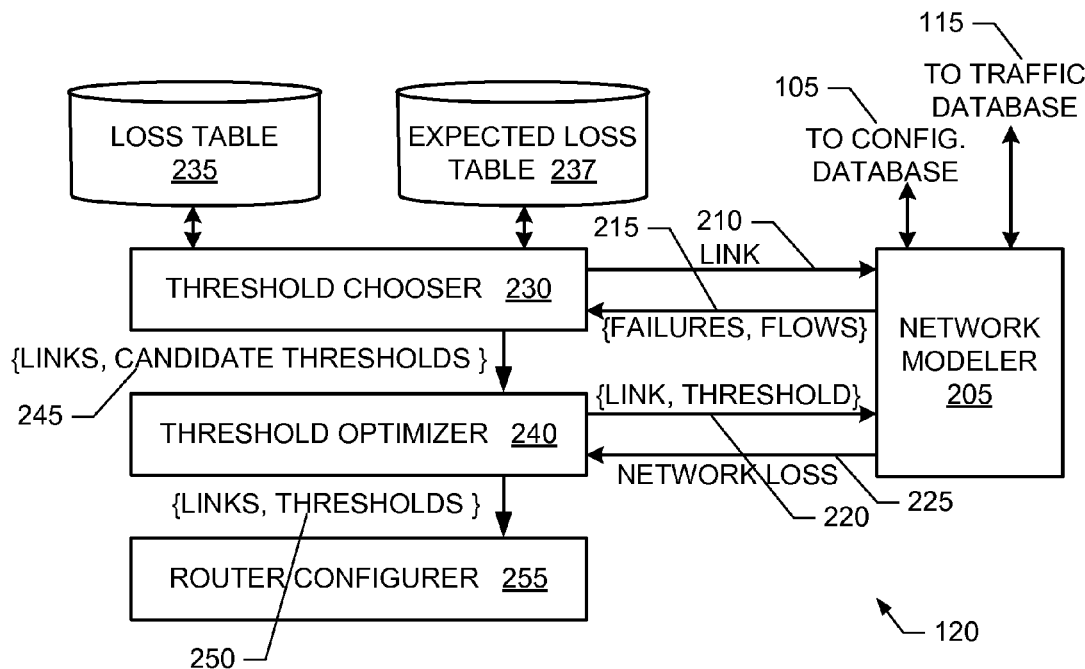
FIG. 2 illustrates an example manner of implementing a threshold setter for the example communication system of FIG. 1.
FIG. 3 illustrates an example data structure that may be used to implement the example loss table of FIG. 2.
FIG. 4 illustrates an example data structure that may be used to implement the example expected loss table of FIG. 2.

FIG. 2 illustrates an example manner of implementing the example threshold setter 120 of FIG. 1. To model performance and/or characteristics of the example communication system 100 of FIG. 1 under different conditions and/or for different network states, the example threshold setter 120 of FIG. 2 includes any number and/or type(s) of network modelers, one of which is designated at reference numeral 205. Based on one or more conditions provided to and/or selected by the network modeler 205, the example network modeler 205 forms a model of the communication system 100 given the condition(s), and uses the generated network model to predict and/or estimate the performance of the communication system 100. For example, the example network modeler 205 can determine a set of layer 1 fault conditions that may potentially affect a particular composite link 210, create network models that represent the communication system 100 under each potential condition, and then estimate, based on the traffic database 115, the amount of data and/or flow rate 215 that will be transported on the composite link 210 for each of the potential failures. Additionally or alternatively, the example network modeler 205 can create a network model that represents the communication system 100 given a set of composite link cost-out thresholds 220, and then estimate a network-wide data packet loss rate 225 given the generated network model.

The example network modeler 205 of FIG. 2 may be implemented using any network modeling and/or performance simulation tool. Example manners of implementing the example network modeler 205 are described in U.S. patent application Ser. No. 12/075,734, entitled "Network Performance Reliability Evaluation Taking Into Account Attributes Other Than Only the Capacities of Edges," and filed on Mar. 13, 2008; U.S. patent application Ser. No. 12/075,735, entitled "Network Performance Reliability Evaluation Taking Into Account Abstract Components," and filed on Mar. 13, 2008; and U.S. patent application Ser. No. 12/075,719 entitled "Network Performance Reliability Evaluation Taking Into Account Multiple Traffic Matrices," and filed on Mar. 13, 2008. U.S. patent application Ser. No. 12/075,734, U.S. patent application Ser. No. 12/075,735 and U.S. patent application Ser. No. 12/075,719 are hereby incorporated by reference in their entireties. Additional and/or alternative example manners of implementing the example network modeler 205 are described in "Network Performability Evaluation for Different Routing Schemes," by Agrawal et al., which appeared in the Proceedings of OFC 2007, and which is hereby incorporated by reference in its entirety.

To select composite link cost-out thresholds, the example threshold setter 120 of FIG. 2 includes a threshold chooser 230. For each composite link 210 of the example communication system 100, the example threshold chooser 230 of FIG. 2 directs the example network modeler 205 to compute and provide sets of failure conditions and composite link flow rates 215 for the composite link 210. Based on the values returned by the example network modeler 205, the example threshold chooser 230 generates a loss table 235. An example data structure that may be used to implement the example loss table 235 of FIG. 2 is shown in FIG. 3. The example data structure of FIG. 3 has a plurality of entries 305 corresponding to various failure conditions 310. For example, a first entry 315 corresponds to failure condition $C_1$ for a composite link 210 comprising 2 OC-192 and 10 OC-48s and where one of the OC-192s is defective.

To store remaining capacities for the composite link 210, each of the example entries 305 of FIG. 3 includes a remaining capacity field 320. Each of the example remaining capacity fields 320 of FIG. 3 contains a number that represents a remaining capacity of the composite link 210 under the corresponding failure condition 310. In some examples, the remaining capacity is expressed in units of OC-48 equivalents. For example, the first entry 315 has a remaining capacity 320 of 14 OC-48 equivalents, which is the collective capacity of the remaining one OC-129 and ten OC-48s.

To store composite link losses, each of the example entries 305 of FIG. 3 includes a loss field 325. Each of example loss fields 325 of FIG. 3 contains a number that represents a difference between a flow rate of the communication system 100 determined, estimated and/or computed using the example network traffic database 115 and given the failure condition 310, and the remaining capacity 320 of the composite link 210. For example, the first entry 315 has a loss 325 of $L_1$. When the estimated flow rate is less than the remaining capacity 320, the corresponding loss field 325 would be less than zero. However, because a loss 325 of less than or equal to zero corresponds to a network condition where the composite link 210 can still support the flow despite the failure condition 310, such entries 305 are not added to and/or are subsequently deleted from the example data structure of FIG. 3. As shown, a failure condition 310 may correspond to two or more simultaneous failures, such as a combination of $C_3$ corresponding to a failure of an OC-192 and $C_7$ corresponding to failures of two OC-48s. Moreover, two failure conditions (for example, $C_2$ and $\{C_3, C_7\}$) may result in identical remaining capacities 320 but different losses 325 when, for example, part of one of the affected flows is redirected within the communication system 100 in response to the failure 310.

Returning to FIG. 2, based on the example loss table 235 the example threshold chooser 230 of FIG. 2 generates an expected loss table 237 that represents the probabilistic expected losses corresponding to respective remaining capacities. An example data structure that may be used to implement the example expected loss table 237 of FIG. 2 is shown in FIG. 4. The example data structure of FIG. 4 has a plurality of entries 405 for corresponding ones of remaining capacity values 410. For example, an example entry 415 corresponds to the example entries 330 of FIG. 3 that have the same remaining capacity 320 of 12 OC-48 equivalents.

To store expected losses, each of the example entries 405 of FIG. 4 includes an expected loss field 420. Each of the example expected loss fields 420 of FIG. 4 contains a value that represents the probabilistic expected loss E(L) for its corresponding remaining capacity 410. The example threshold chooser 230 of FIG. 2 computes an expected loss value 420 by multiplying the corresponding loss value 325 of FIG. 3 (for example, $L_1$) with the occurrence probability of the corresponding failure event 310 (for example, $Pr(C_1)$). As shown in FIG. 4, if two or more entries 305 of FIG. 3 (for example, the example entries 330) have the same remaining capacity 320, then the expected loss 420 is a sum of their individual expected losses.

The example data structure of FIG. 4 may be given the following intuitive interpretation. Consider the example failure $C_1$. If there is not a cost-out threshold for the composite link 210, then the failure $C_1$ causes $L_1$ more units of traffic on the composite link 210 than its capacity 320. If there is enough capacity elsewhere in the example communication system 100, the loss $L_1$ can be prevented by setting a rerouting threshold for the composite link 210 to 14 OC-48 equivalents. Thus, in general, the expected loss values 420 are indicative of the savings that may potentially be gained by choosing the corresponding remaining capacity 410 as the cost-out threshold for the composite link 210. The savings are cumulative, meaning that the savings are $P_4L_4$ for a threshold 410 of 9, and the savings are $P_4L_4+Pr(C_2)L_2+Pr(C_3,C_7)L_3$ for a threshold 410 of 12.

Returning to FIG. 2 and assuming the example entries 405 of FIG. 4 are ordered and/or sorted based on the remaining capacity values 410, the example threshold chooser 230 of FIG. 2 computes differences between the expected loss values 420 of adjacent entries 405, and identifies the smallest computed difference. The example threshold chooser 230 selects as a candidate cost-out threshold 245 for the composite link 210 the smaller of the two remaining capacity values 410 associated with the smallest difference. For example, if the difference between expected losses 430 and 435 is smaller than the difference between expected losses 435 and 440, the threshold chooser 230 selects 9 as the candidate cost-out threshold for the composite link 210.

As described above, the example threshold chooser 230 selects a candidate threshold for each composite link C1 and C2 of the example communication system 100. To verify that the set of candidate thresholds 245 selected by the threshold chooser 230 improves the performance of the example communication system 100 and/or to further optimize the selected composite link cost-out thresholds 245, the example threshold setter 120 of FIG. 3 includes a threshold optimizer 240. For each composite link C1, C2, the example threshold optimizer 240 uses the example network modeler 205 to simulate and/or estimate the network-wide packet loss for various cost-out threshold values 220 for the presently considered composite link by repeatedly executing the example network modeler 205. The threshold 220 is adjusted by the example threshold optimizer 240 within a range that includes the candidate threshold 245 selected by the example threshold chooser 230 for the presently considered composite link C1, C2. While the cost-out threshold 220 for the composite link C1, C2 is being optimized, the cost-out thresholds of other composite links C1, C2 are held constant at either their candidate cost-out threshold or at their optimized candidate cost-out threshold if they have already been processed by the example threshold optimizer 240. That is, a local optimization of the cost-out threshold for each composite link C1, C2 using a network-wide performance metric.

To configure the example routers R0-R3 of FIG. 1 with optimized cost-out thresholds 250 selected by the example threshold optimizer 240, the example threshold setter 120 of FIG. 2 includes a router configurer 255. Using any number and/or type(s) of method(s), protocol(s) and/or interface(s), the example router configurer 255 of FIG. 2 directly configures each of the example routers R0-R3 with a cost-out threshold 250 for each of the composite links C1 and C2 that are communicatively coupled to the router R0-R3. Additionally or alternatively, the example router configurer 255 adds and/or updates cost-out threshold data in the network configuration database 105, which may be used to, for example, subsequently configure cost-out thresholds for the routers R0-R3.

While an example manner of implementing the example threshold setter 120 of FIG. 1 has been illustrated in FIG. 2, one or more of the interfaces, data structures, elements, processes and/or devices illustrated in FIG. 2 may be combined, divided, re-arranged, omitted, eliminated and/or implemented in any other way. Further, the example network modeler 205, the example threshold chooser 230, the example tables 235 and 237, the example threshold optimizer 240, the example router configurer 255 and/or, more generally, the example threshold setter 120 of FIG. 2 may be implemented by hardware, software, firmware and/or any combination of hardware, software and/or firmware. Thus, for example, any of the example network modeler 205, the example threshold chooser 230, the example tables 235 and 237, the example threshold optimizer 240, the example router configurer 255 and/or, more generally, the example threshold setter 120 may be implemented by one or more circuit(s), programmable processor(s), ASIC(s), PLD(s) and/or FPLD(s), etc. Further still, a threshold setter may include interfaces, data structures, elements, processes and/or devices instead of, or in addition to, those illustrated in FIG. 2 and/or may include more than one of any or all of the illustrated interfaces, data structures, elements, processes and/or devices.

Figure 5:
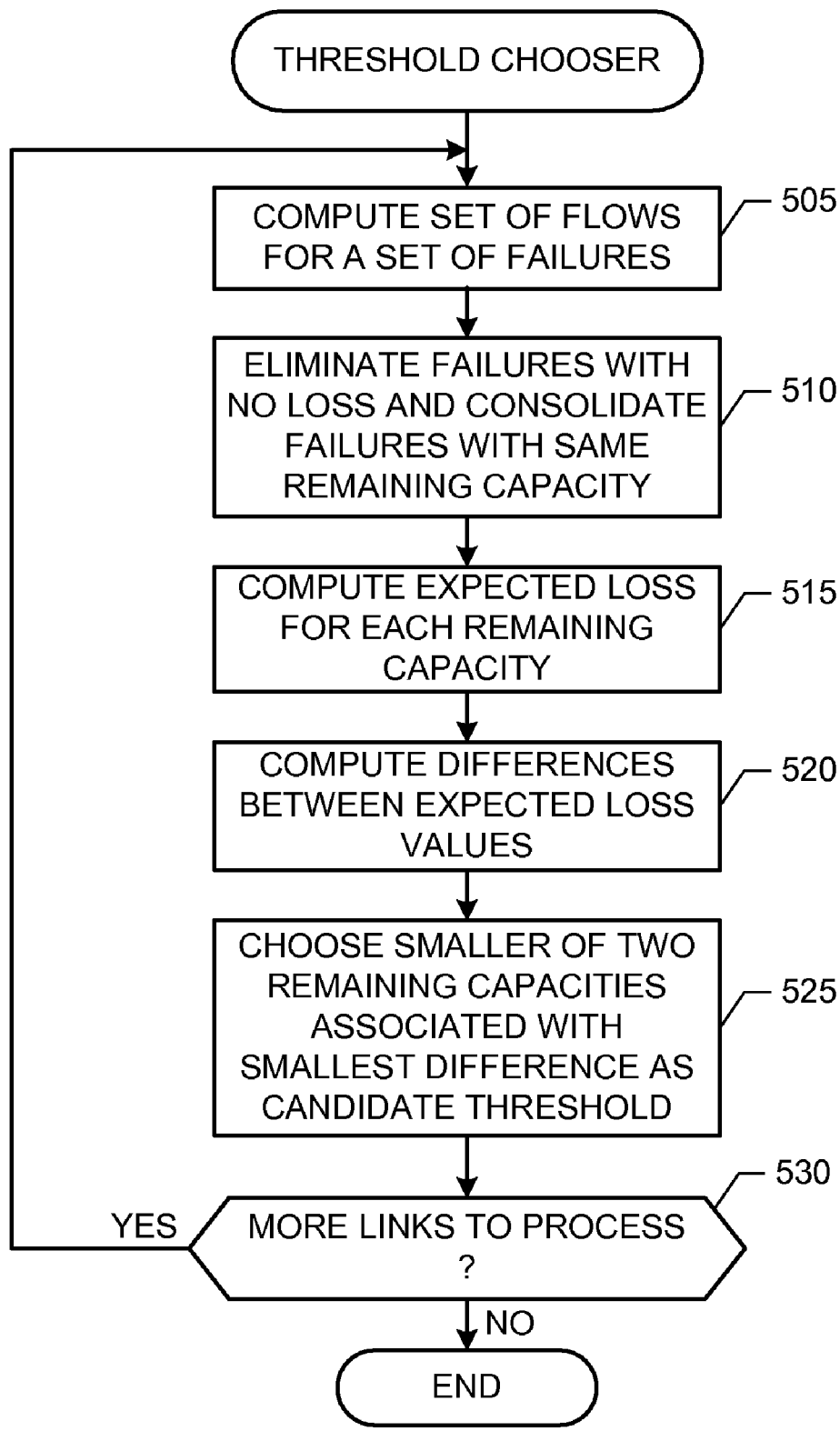
FIGS. 5 and 6 are flowcharts representative of example processes that may be carried out to implement the example threshold setters of FIGS. 1 and 2.
Figure 6:
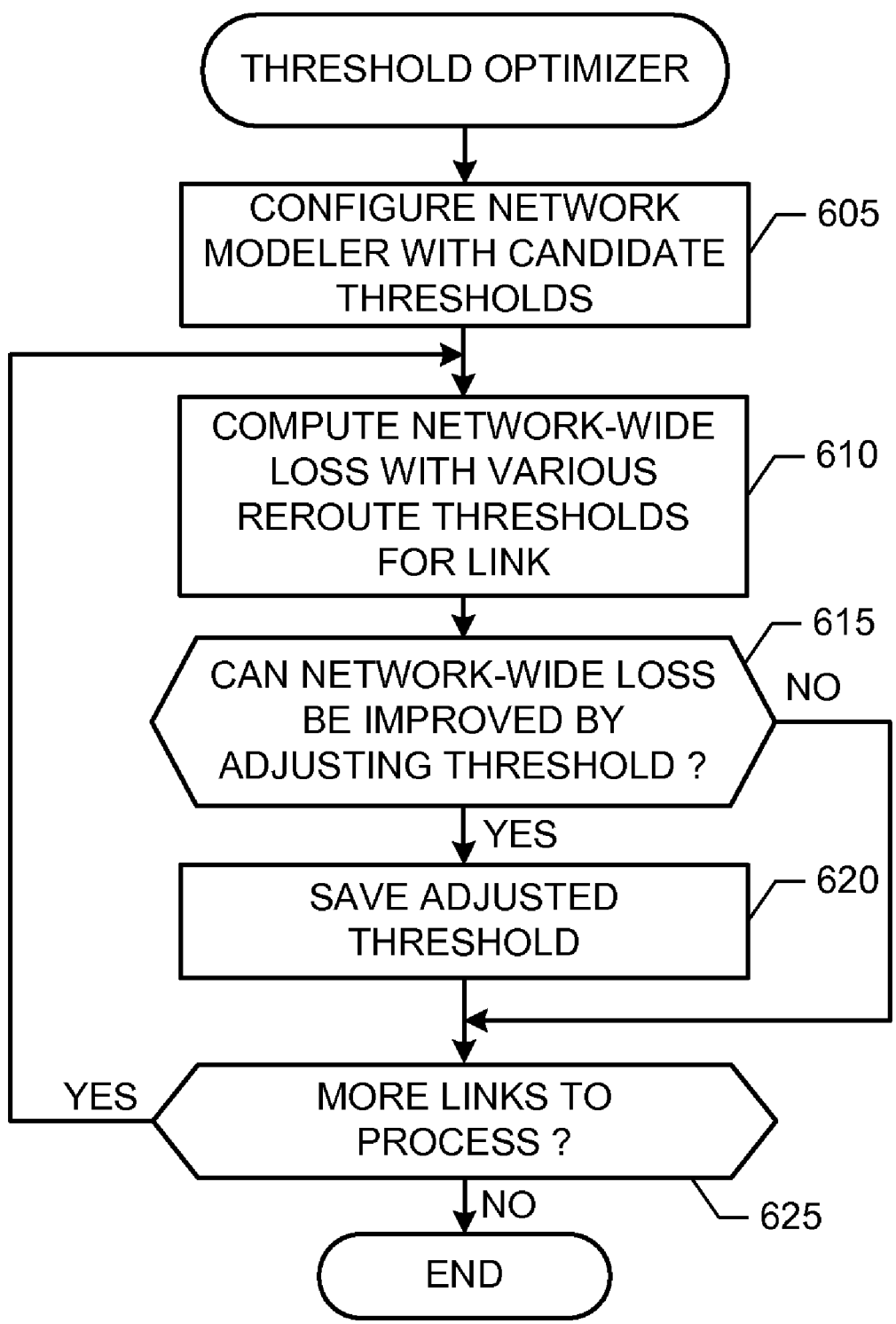

FIG. 5 illustrates a flowchart representative of an example process that may be carried out to implement the example threshold chooser 230 of FIG. 2. FIG. 6 illustrates a flowchart representative of an example process that may be carried out to implement the example threshold optimizer 240 of FIG. 2. The example processes of FIGS. 5 and/or 6 may be carried out by a processor, a controller and/or any other suitable processing device. For example, the example processes of FIGS. 5 and/or 6 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible and/or machine-readable instructions or data structures, and which can be accessed by a processor, a general-purpose or special-purpose computer, or other machine with a processor (for example, the example processor platform P100 discussed below in connection with FIG. 7). Combinations of the above are also included within the scope of computer-readable media. Machine-readable instructions comprise, for example, instructions and/or data that cause a processor, a general-purpose computer, special-purpose computer, or a special-purpose processing machine to implement one or more particular processes. Alternatively, some or all of the example processes of FIGS. 5 and/or 6 may be implemented using any combination(s) of ASIC(s), PLD(s), FPLD(s), discrete logic, hardware, firmware, etc. Also, some or all of the example processes of FIGS. 5 and/or 6 may instead be implemented manually or as any combination of any of the foregoing techniques, for example, any combination of firmware, software, discrete logic and/or hardware. Further, many other methods of implementing the example operations of FIGS. 5 and/or 6 may be employed. For example, the order of execution of the blocks may be changed, and/or one or more of the blocks described may be changed, eliminated, sub-divided, or combined. Additionally, any or all of the example processes of FIGS. 5 and/or 6 may be carried out sequentially and/or carried out in parallel by, for example, separate processing threads, processors, devices, discrete logic, circuits, etc.

The example process of FIG. 5 begins with the example threshold chooser 230 directing the example network modeler 205 of FIG. 2 to compute, simulate and/or estimate a set of flows for corresponding ones of potential fault conditions for a presently considered composite link C1, C2, and generates the example loss table 235 (block 505). The threshold chooser 230 eliminates any entries 305 of the loss table 235 that correspond to a loss 325 of zero, and combines entries 305 that have the same remaining capacity 320 to form the expected loss table 237 (block 510). For each entry 405 of the expected loss table 237, the threshold chooser 230 computes an expected loss value 420 (block 515). The threshold chooser 230 computes differences between adjacent expected loss values 420 and identifies the smallest difference (block 520). The threshold chooser 230 selects as a candidate cost-out threshold 245 for the presently considered composite link C1, C2 the smaller of the two remaining capacity values 410 associated with the smallest difference (block 525). If there are more composite links C1, C1 to process (block 530), control returns to block 505 to process the next composite link. If there are no more composite links C1, C2 to process (block 530), control exits from the example process of FIG. 5.

The example process of FIG. 6 begins with the example threshold optimizer 240 configuring the example network modeler 205 of FIG. 2 with a set of candidate thresholds 245 for each composite link C1, C2 of the example communication system 100 (block 605). For a presently considered composite link C1, C2, the threshold optimizer 240 directs the network modeler 205 to compute a set of network-wide packet loss for each of a plurality of cost-out thresholds 220 for the presently considered composite link C1, C2 (block 610). In some examples, the example threshold optimizer 240 repeatedly executes the network modeler 205 for different values of the cost-out threshold 220 for the presently considered composite link C1, C2 to obtain the plurality of network-wide packet losses.

The threshold optimizer 240 determines whether any other adjusted cost-out thresholds provides a better network-wide packet loss than the candidate cost-out threshold for the presently considered composite link C1, C2 (block 615). If one of the adjusted cost-out thresholds is preferable to the candidate cost-out threshold (block 615), the threshold optimizer 240 saves and/or records the adjusted threshold, and updates the configuration of the network modeler 205 with the adjusted cost-out threshold for the composite link C1, C2 (block 620). If there are more composite links C1, C1 to process (block 625), control returns to block 610 to process the next composite link. If there are no more composite links C1, C2 to process (block 625), control exits from the example process of FIG. 6.

Figure 7:
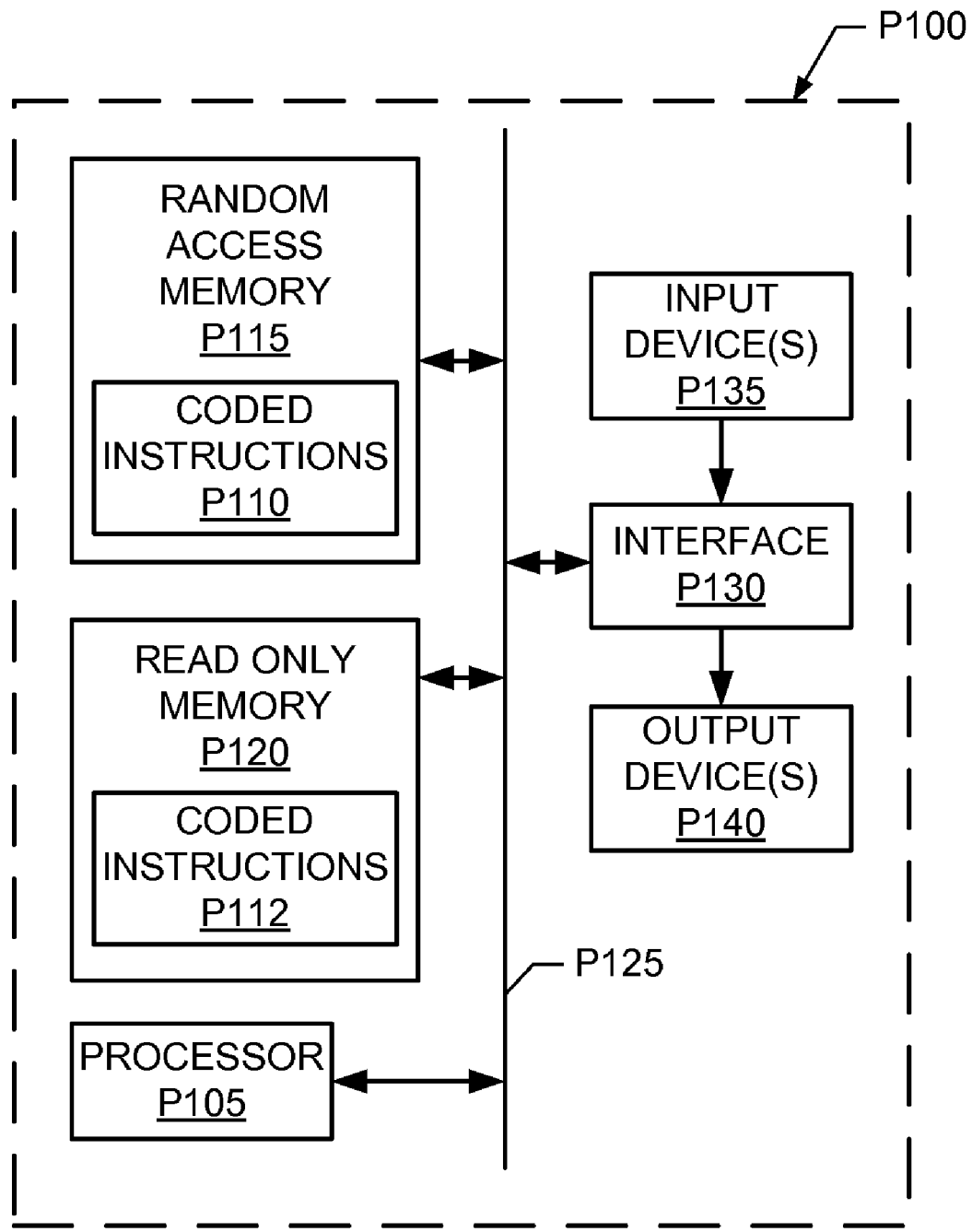
FIG. 7 is a schematic illustration of an example processor platform that may be used and/or programmed to carry out the example processes of FIGS. 5 and 6, and/or to implement any of all of the methods and apparatus disclosed herein.

FIG. 7 is a schematic diagram of an example processor platform P100 that may be used and/or programmed to implement the example threshold setter 120 of FIGS. 1 and 2. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (for example, within a RAM P115 and/or a ROM P120). The processor P105 may be any type of processing unit, such as a processor core, a processor and/or a microcontroller. The processor P105 may execute, among other things, the example processes of FIGS. 5 and 6 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example loss table 235 and/or the example expected loss table 237 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the router configurer 255 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
collecting traffic statistics for a communication network;
computing, based on the traffic statistics, a plurality of projected flow rates for a composite link of the communication network for respective ones of a plurality of potential fault conditions for the composite link;
computing a plurality of projected remaining capacities of the composite link for respective ones of the plurality of fault conditions, each of the plurality of projected remaining capacities representing a difference between a projected capacity of the composite link were the corresponding potential fault condition to occur and the corresponding projected flow rate;
selecting a cost-out threshold for the composite link based on the plurality of projected flow rates and the plurality of projected remaining capacities, the cost-out threshold representing an actual remaining capacity of the composite link when a router stops at least one of routing or transporting data via the composite link; and
configuring the router associated with the composite link with the cost-out threshold.

2. A method as defined in claim 1, wherein the composite link comprises first and second communication paths, and wherein a first potential fault condition comprises a first defect in the first communication path and a second potential fault condition comprises a second defect in the second communication path.

3. A method as defined in claim 1, further comprising comparing an operating capacity of the composite link to the cost-out threshold to determine whether to cost-out data from the composite link to another communication path.

4. A method as defined in claim 1, further comprising:
computing a plurality of arithmetic differences between respective ones of the plurality of flow rates and the plurality of remaining capacities;
eliminating differences that are less than or equal to zero from the plurality of differences to form a plurality of losses;
computing a first expected loss based on at least one of the plurality of losses having a first associated remaining capacity;
computing a second expected loss based on at least one of the plurality of losses having a second associated remaining capacity, wherein the second remaining capacity is greater than the first remaining capacity; and
computing a third expected loss based on at least one of the plurality of losses having a third associated remaining capacity, wherein the third remaining capacity is greater than the second remaining capacity, and wherein the cost-out threshold is selected based on the first, second and third expected losses.

5. A method as defined in claim 4, further comprising:
computing a first arithmetic difference between the first and second expected losses;
computing a second arithmetic difference between the second and third expected losses; and
selecting the first associated remaining capacity as the cost-out threshold when the first arithmetic difference is less than the second arithmetic difference.

6. A method as defined in claim 1, further comprising:
computing a first network-wide packet loss for the communication network based on the cost-out threshold selected and the traffic statistics collected;
adjusting the cost-out threshold;
computing a second network-wide packet loss for the communication network based on the cost-out threshold adjusted and the traffic statistics collected; and
comparing the first and second network-wide packet losses to determine whether to select the cost-out threshold adjusted.

7. An apparatus comprising:
a collector to collect traffic statistics for a communication network;
a network modeler to compute, based on the traffic statistics, a plurality of projected flow rates for a composite link of the communication network for respective ones of a plurality of potential fault conditions for the composite link, and to compute a plurality of projected remaining capacities of the composite link for respective ones of the plurality of fault conditions, each of the plurality of projected remaining capacities representing a difference between a projected capacity of the composite link were the corresponding potential fault condition to occur and the corresponding projected flow rate; and
a threshold chooser to select a cost-out threshold for the composite link based on the plurality of projected flow rates and the plurality of projected remaining capacities computed, the cost-out threshold representing an actual remaining capacity of the composite link when a router stops at least one of routing or transporting data via the composite link.

8. An apparatus as defined in claim 7, wherein the composite link comprises first and second communication paths, and wherein a first potential fault condition comprises a first defect in the first communication path and a second potential fault condition comprises a second defect in the second communication path.

9. An apparatus as defined in claim 7, further comprising:
a router associated with the composite link to compare an operating capacity of the composite link to the cost-out threshold to determine whether to cost-out data from the composite link to another communication path; and
a router configurer to configure the router with the cost-out threshold selected.

10. An apparatus as defined in claim 7, further comprising a first data structure having a plurality of entries for respective ones of the plurality of fault conditions, wherein a first entry of the first data structure comprises a first flow rate, a first remaining capacity and a first loss associated with a first fault condition.

11. An apparatus as defined in claim 10, wherein the threshold chooser is to eliminate from the first data structure a second entry comprising a second loss that is less than or equal to zero.

12. An apparatus as defined in claim 7, wherein the threshold chooser is to:
    compute a plurality of arithmetic differences between respective ones of the plurality of flow rates and the plurality of remaining capacities;
    compute a first expected loss based on at least one of the plurality of differences having a first associated remaining capacity;
    compute a second expected loss based on at least one of the plurality of differences having a second associated remaining capacity, wherein the second remaining capacity is greater than the first remaining capacity;
    compute a third expected loss based on at least one of the plurality of differences having a third associated remaining capacity, wherein the third remaining capacity is greater than the second remaining capacity, and
    select the cost-out threshold based on the first, second and third expected losses.

13. An apparatus as defined in claim 12, wherein the threshold chooser is to:
    compute a first arithmetic difference between the first and second expected losses;
    compute a second arithmetic difference between the second and third expected losses; and
    select the first associated remaining capacity as the cost-out threshold when the first arithmetic difference is less than the second arithmetic difference.

14. An apparatus as defined in claim 7, further comprising a threshold optimizer to:
    compute a first network-wide packet loss for the communication network based on the cost-out threshold selected and the traffic statistics collected;
    adjust the cost-out threshold;
    compute a second network-wide packet loss for the communication network based on the cost-out threshold adjusted and the traffic statistics collected; and
    compare the first and second network-wide packet losses to determine whether to select the cost-out threshold adjusted.

15. A tangible article of manufacture excluding propagating signals and storing machine-readable instructions that, when executed, cause a machine to:
    collect traffic statistics for a communication network;
    compute, based on the traffic statistics, a plurality of projected flow rates for a composite link of the communication network for respective ones of a plurality of potential fault conditions for the composite link;
    compute a plurality of projected remaining capacities of the composite link for respective ones of the plurality of fault conditions, each of the plurality of projected remaining capacities representing a difference between a projected capacity of the composite link were the corresponding potential fault condition to occur and the corresponding projected flow rate;
    compute a plurality of arithmetic differences between respective ones of the plurality of projected flow rates and the plurality of projected remaining capacities; and
    select a cost-out threshold for the composite link based on the plurality of arithmetic differences, the cost-out threshold representing an actual remaining capacity of the composite link when a router stops at least one of routing or transporting data via the composite link.

16. An article of manufacture as defined in claim 15, wherein the composite link comprises first and second communication paths, and wherein a first potential fault condition comprises a first defect in the first communication path and a second potential fault condition comprises a second defect in the second communication path.

17. An article of manufacture as defined in claim 15, wherein the machine-readable instructions, when executed, cause the machine to compare an operating capacity of the composite link to the cost-out threshold to determine whether to cost-out data from the composite link to another communication path.

18. An article of manufacture as defined in claim 15, wherein the machine-readable instructions, when executed, cause the machine to configure a router associated with the composite link with the cost-out threshold.

19. An article of manufacture as defined in claim 15, wherein the machine-readable instructions, when executed, cause the machine to:
    eliminate differences that are less than or equal to zero from the plurality of differences to form a plurality of losses;
    compute a first expected loss based on one or more of the plurality of losses having a first associated remaining capacity;
    compute a second expected loss based on one or more of the plurality of losses having a second associated remaining capacity, wherein the second remaining capacity is greater than the first remaining capacity; and
    compute a third expected loss based on one or more of the plurality of losses having a third associated remaining capacity, wherein the third remaining capacity is greater than the second remaining capacity, and wherein the cost-out threshold is selected based on the first, second and third expected losses.

20. An article of manufacture as defined in claim 19, wherein the machine-readable instructions, when executed, cause the machine to:
    compute a first arithmetic difference between the first and second expected losses;
    compute a second arithmetic difference between the second and third expected losses; and
    select the first associated remaining capacity as the cost-out threshold when the first arithmetic difference is less than the second arithmetic difference.

21. An article of manufacture as defined in claim 15, wherein the machine-readable instructions, when executed, cause the machine to:
    compute a first network-wide packet loss for the communication network based on the cost-out threshold selected and the traffic statistics collected;
    adjust the cost-out threshold;
    compute a second network-wide packet loss for the communication network based on the cost-out threshold adjusted and the traffic statistics collected; and
    compare the first and second network-wide packet losses to determine whether to select the cost-out threshold adjusted.

* * * * *